March 16, 1943.　　　　R. WELCH　　　　2,314,298
TANK MOUNTING
Filed April 16, 1941
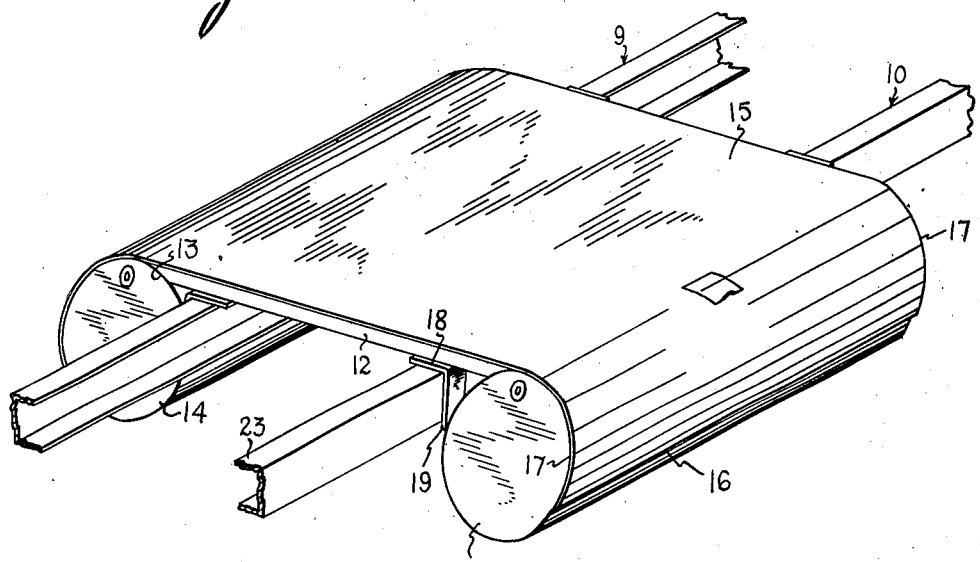
Fig. 1
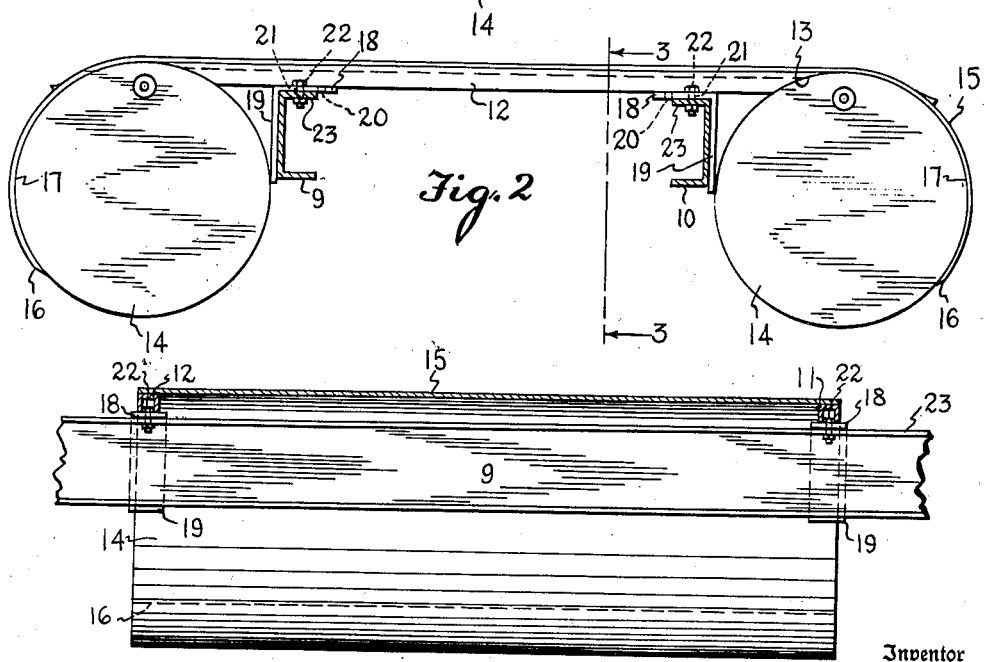
Fig. 2
Fig. 3
Inventor
Russel Welch
By
Attorney Patented Mar. 16, 1943

2,314,298

UNITED STATES PATENT OFFICE 2,314,298

TANK MOUNTING

Russel Welch, Detroit, Mich., assignor of one-half to James H. Turner, Detroit, Mich.

Application April 16, 1941, Serial No. 389,895

7 Claims. (Cl. 280—5)

My invention relates to a new and useful improvement in a tank supporting mechanism and in general the tank assembly in connection with the supporting mechanism. The invention is particularly adapted for use on self-propelling vehicles such as trucks or the like, whether driven by gasoline, oil or similar fuel.

The invention is particularly adapted for use in connection with that type of trucking vehicle which embodies a tractor or propelling part to which is attached a trailer or carrying part. In the construction of such vehicles the tractor or propelling part of the vehicle is made of minimum length and has a minimum amount of space on which articles may be mounted. It is customary on trucks which are used for long distance hauling, to provide auxiliary fuel tanks so that the driver is able to carry sufficient fuel to take him to his destination and return. To maintain these auxiliary tanks on the tractor or the propelling part of a truck requires that the structure be durable, that it be sufficiently flexible to compensate for the distortions of the frame in traveling over rough roads while, at the same time, it may be rigid enough to hold the tanks in their desired positions. It is also desirable that this structure be light and easily and quickly assembled. To accomplish these purposes is an object of the present invention.

It is also an object of the present invention to provide a structure whereby a pair of tanks may be secured together, the structure so arranged that it may be deposited and quickly secured in position on the carrying part of the vehicle.

Another object of the invention is the provision of a mounting for reserve tanks so arranged and constructed that the likelihood of mistakes in mounting the same, by an inexperienced person, is reduced to a minimum.

Another object of the invention, in combination with the chassis rails of a vehicle, of a pair of supporting rails connected together by a plate-like body with the plate-like body and supporting rails together supporting the brackets secured to a fluid tank.

Other objects will appear hereinafter.

It is recognized that various modifications and changes may be made in the invention without departing from the spirit thereof and it is intended that such shall be brought within the scope of the claims attached hereto and forming a part hereof.

Forming a part of the specification is a drawing in which:

Fig. 1 is a perspective view of the invention showing the invention applied.

Fig. 2 is an end elevational view of the invention.

Fig. 3 is a sectional view taken on line 3—3 of Fig. 2.

Illustrated in the drawing are oppositely disposed spaced apart chassis rails 9 and 10 which form a part of the vehicle on which the tank is to be mounted. Extending transversely of these chassis rails 9 and 10 over the top thereof are supporting rails 11 and 12. Each of these rails is cut away at its opposite ends as at 13 to provide an arcuate surface which corresponds to the circumference of the tank 14. The tank 14 and the rails 11 and 12 are welded together so that the rails 11 and 12 thus serve as a framework to connect the tanks 14 together. Covering the space between the rails 11 and 12 is a plate-like body 15 formed from sheet metal and welded along its end edges 16 to the tanks 14. This plate is curved around the tanks 14 as clearly shown in Fig. 1 and Fig. 2, and the plate 15 is also welded to the tanks along its opposite edges at the portions 17. This plate 15 is also welded to the upper surface of the rails 11 and 12. Welded to the under surface of the rails 11 and 12 is a horizontally disposed portion 13 of an L-shaped bracket, the depending leg 19 thereof contacting with the periphery of the tank 14 and being welded thereto. These chassis rails 9 and 10 are, in standard construction, spaced apart a predetermined distance and experience has shown that two dimensions are used, the rails 9 and 10 being spaced apart 36 inches on one type of motor vehicle and 34 inches on the other type. When the structure described is placed in position on the rails 9 and 10, the horizontally disposed portion 11' of the L-shaped brackets will rest upon the upper surface of the rails 9 and 10. This horizontally disposed portion has a pair of openings 20 and 21 formed therein and, through either of these openings, depending upon the spacing of the rails 9 and 10, may be projected a bolt 22 which also is projected through the upper flange 23 of the rails 9 and 10 to afford a means for securing the structure together.

Consequently, when the tank structure embodying the tanks 14, the rails 13, plate 15 and brackets is placed on the rails 9 and 10, as shown in Fig. 1, it will be necessary to previously have formed openings in the flange 23 through which the bolts 22 may be projected so that the device may be easily and quickly secured in position.

By connecting the structure with the plate 15 and surrounding the tanks 14 in the manner indicated, the use of the supporting rods extended around the tanks may be avoided and the likelihood of injuring the tank because of its supports, reduced to a minimum. This structure has also proven durable and highly satisfactory for the purposes mentioned, accomplishing the various advantages enumerated above.

What I claim as new is:

1. In combination with a vehicle having a pair of spaced apart chassis rails, supporting rails extending transversely of and supported by said chassis rails and extending at opposite ends beyond the same; a tank secured to the end of said supporting rails; and a plate resting upon and secured to said supporting rails and secured to said tank for supporting the same.

2. In combination with a vehicle having a pair of spaced apart chassis rails, supporting rails extending transversely of and supported by said chassis rails and extending at opposite ends beyond the same; a tank secured to the end of said supporting rails; and a plate resting upon and secured to said supporting rails and secured to said tank for supporting the same; and brackets supported on said chassis rails and secured to said tank for supporting the same.

3. A structure of the class described comprising: a pair of spaced apart supporting rails; a pair of tanks, said supporting rails being connected at their opposite ends to said tanks; and a plate resting upon and extending at its opposite ends beyond the ends of said supporting rails and connected at its opposite ends to the periphery of said tanks.

4. A structure of the class described comprising: a pair of spaced apart supporting rails; a pair of tanks, said supporting rails being connected at their opposite ends to said tanks; and a plate resting upon and extending at its opposite ends beyond the ends of said supporting rails and connected at its oppostie ends to the periphery of said tanks; and brackets connected to said rails and projecting downwardly therefrom and connected at their lower ends to the periphery of said tanks.

5. A structure of the class described comprising: a pair of spaced apart supporting rails having their opposite ends struck on an arc; a pair of tanks, said tanks engaging the arcuate ends of said rails; a plate resting upon said rails and extending at its opposite ends beyond the ends of said rails and curved to lie in engagement with the periphery of said tanks and secured thereto at the edges thereof at the portion in engagement with said tanks.

6. A structure of the class described comprising: a pair of spaced apart supporting rails having their opposite ends struck on an arc; a pair of tanks, said tanks engaging the arcuate ends of said rails; a plate resting upon said rails and projecting at its opposite ends beyond said rails and curved to lie in engagement with the periphery of said tanks and secured thereto at the edges thereof at the portion in engagement with said tanks, and secured to said rails; and brackets secured to said rails and projecting inwardly therefrom and secured at their lower ends to said tanks.

7. In combination with a vehicle having spaced apart chassis rails; a pair of supporting rails extended transversely across said chassis rails and formed arcuate at their opposite ends; a curvilinear tank abutting against the arcuate end of each of said rails and secured thereto; a plate resting upon said rails and projecting at its ends beyond the ends of said rails and folded at its end into engagement with the periphery of said tanks and secured thereto along the edges thereof at the portion in engagement with said tanks; and supporting brackets secured to said rails and projecting downwardly therefrom; and means for securing said brackets to said chassis rails.

RUSSEL WELCH.